(12) United States Patent
Lee et al.

(10) Patent No.: US 11,527,805 B2
(45) Date of Patent: Dec. 13, 2022

(54) LASER WELDING APPARATUS COMPRISING LASER BEAM BLOCKING BLOCK

(71) Applicant: LG CHEM, LTD., Seoul (KR)

(72) Inventors: Jung-Hoon Lee, Daejeon (KR); Kyung-Mo Kim, Daejeon (KR); Jin-Yong Park, Daejeon (KR); Ho-June Chi, Daejeon (KR); Dal-Mo Kang, Daejeon (KR); Jeong-O Mun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 471 days.

(21) Appl. No.: 16/617,326

(22) PCT Filed: Dec. 11, 2018

(86) PCT No.: PCT/KR2018/015725
§ 371 (c)(1),
(2) Date: Nov. 26, 2019

(87) PCT Pub. No.: WO2019/135505
PCT Pub. Date: Jul. 11, 2019

(65) Prior Publication Data
US 2020/0266416 A1    Aug. 20, 2020

(30) Foreign Application Priority Data
Jan. 5, 2018    (KR) .......................... 10-2018-0001931

(51) Int. Cl.
*B23K 26/06*    (2014.01)
*B23K 26/08*    (2014.01)
(Continued)

(52) U.S. Cl.
CPC ............ *H01M 50/531* (2021.01); *B23K 26/21* (2015.10); *B23K 26/702* (2015.10); *B23K 37/0443* (2013.01); *H01M 50/502* (2021.01)

(58) Field of Classification Search
CPC .................. B23K 26/06; B23K 26/064; B23K 26/066–0661; B23K 26/08–082;
(Continued)

(56) References Cited

U.S. PATENT DOCUMENTS

2007/0114222 A1* 5/2007 Shon ........................ A21B 3/04
                                                              219/401
2013/0071738 A1    3/2013 Wang
(Continued)

FOREIGN PATENT DOCUMENTS

CN    101771142 A    7/2010
CN    101982285 A    3/2011
(Continued)

OTHER PUBLICATIONS

English translation of KR20170052985 (Year: 2017).*
(Continued)

*Primary Examiner* — Michael A Laflame, Jr.
(74) *Attorney, Agent, or Firm* — Birch, Stewart, Kolasch & Birch, LLP

(57) ABSTRACT

Provided is a laser welding apparatus configured to weld an electrode lead of at least one secondary battery of a battery module and a main bus bar configured to electrically connect a plurality of secondary batteries to each other. The laser welding apparatus includes: a laser beam emitting unit including a laser emitting element to irradiate a laser beam to the electrode lead and the main bus bar; a pressing jig including a pressing bar configured to move in a left-and-right direction such that the electrode lead is adhered to the main bus bar; and a blocking block movable to block the
(Continued)

laser beam generated in the laser beam emitting unit from reaching the at least one secondary battery or movable to allow the generated laser beam to pass therethrough, according to a position of the pressing bar moved in the left-and-right direction.

12 Claims, 11 Drawing Sheets

(51) Int. Cl.
    *B23K 26/21*     (2014.01)
    *H01M 50/531*     (2021.01)
    *B23K 26/70*     (2014.01)
    *B23K 37/04*     (2006.01)
    *H01M 50/502*     (2021.01)

(58) Field of Classification Search
    CPC ............ B23K 26/21–22; B23K 26/702; B23K 37/04–0443
    See application file for complete search history.

(56) References Cited

U.S. PATENT DOCUMENTS

| | | | |
|---|---|---|---|
| 2013/0164590 A1 | 6/2013 | Kong et al. | |
| 2013/0221532 A1 | 8/2013 | Fujita et al. | |
| 2013/0330595 A1 | 12/2013 | Lee et al. | |
| 2015/0111091 A1 | 4/2015 | Lee et al. | |
| 2015/0287973 A1 | 10/2015 | Kim et al. | |
| 2016/0288246 A1 | 10/2016 | Ichinose et al. | |
| 2017/0170445 A1 | 6/2017 | Kim et al. | |
| 2019/0184502 A1* | 6/2019 | Kim | ........................ H01M 8/04 |
| 2020/0147734 A1* | 5/2020 | Hong | ................... B23K 26/037 |

FOREIGN PATENT DOCUMENTS

| | | |
|---|---|---|
| CN | 102179593 A | 9/2011 |
| CN | 103296866 A | 9/2013 |
| CN | 107150173 A | 9/2017 |
| JP | 10-163550 A | 6/1998 |
| JP | 2013-157151 A | 8/2013 |
| KR | 10-2012-0008456 A | 1/2012 |
| KR | 10-2012-0065279 A | 6/2012 |
| KR | 10-2012-0121346 A | 11/2012 |
| KR | 10-1301138 B1 | 9/2013 |
| KR | 10-2015-0046946 A | 5/2015 |
| KR | 10-2015-0115510 A | 10/2015 |
| KR | 10-2017-0028148 A | 3/2017 |
| KR | 10-2017-0052985 A | 5/2017 |
| KR | 10-1750597 B1 | 6/2017 |
| KR | 10-2017-0117607 A | 10/2017 |
| KR | 10-2017-0119381 A | 10/2017 |

OTHER PUBLICATIONS

International Search Report issued in PCT/KR2018/015725 (PCT/ISA/210), dated Mar. 11, 2019.

Extended European Search Report for European Application No. 18898411.6, dated Nov. 13, 2020.

* cited by examiner

LASER WELDING APPARATUS COMPRISING LASER BEAM BLOCKING BLOCK

TECHNICAL FIELD

The present disclosure relates to a laser welding apparatus including a laser beam blocking block, and more particularly, to a laser welding apparatus capable of preventing damage to a battery module caused by a laser beam.

The present application claims priority to Korean Patent Application No. 10-2018-0001931 filed on Jan. 5, 2018 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, etc. and the lithium secondary batteries thereamong are receiving attention due to advantages of free charging/discharging, a very low self-discharge rate, and high energy density since a memory effect is barely generated compared to nickel-based secondary batteries.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery pouch exterior material, sealing and accommodating the electrode assembly with an electrolyte solution together.

Generally, the lithium secondary battery may be classified into a can-type secondary battery, in which the electrode assembly is embedded in a metal can, and a pouch-type secondary battery, in which the electrode assembly is embedded in a pouch of an aluminum laminate sheet, according to a shape of the exterior material.

Recently, the secondary battery is widely used not only in a small-sized apparatus, such as a portable electronic device, but also in medium- and large-sized apparatuses, such as a vehicle or an energy storage apparatus. When the secondary battery is used in the medium- and large-sized apparatuses, a large number of secondary batteries are electrically connected to increase capacity and output. In particular, the pouch-type secondary battery is mostly used in such medium- and large-sized apparatuses due to easy stacking.

For example, in order for the secondary batteries to be electrically connected inside a battery module, electrode leads may be connected to each other and a connected portion may be welded to maintain such a connected state. Moreover, the battery module may have parallel and/or series electric connection between the secondary batteries, and in this case, one end portion of the electrode lead may contact and be fixed to a bus bar for electric connection between the secondary batteries, via welding or the like.

At this time, the electric connection between the secondary batteries is often configured by bonding the electrode lead to the bus bar. In other words, in order to electrically connect the plurality of secondary batteries in parallel, the electrode leads of same polarity are connected and bonded to each other, and in order to electrically connect the plurality of secondary batteries in series, the electrode leads of different polarities are connected and bonded to each other.

Meanwhile, a battery module of the related art employs a laser welding method of irradiating a laser beam to a welding region to weld am electrode lead and a bus bar.

However, in such a laser welding method, when a laser welding apparatus malfunctions during a welding process between the bus bar and the electrode lead of a secondary battery, the laser beam may be irradiated while a welding zig is not positioned at a proper position of the battery module. In this case, the erroneously irradiated laser beam is directly irradiated to the secondary battery of the battery module, thereby damaging the secondary battery, and when severely irradiated, igniting the secondary battery, and thus there is a high risk.

In this regard, there is a need for a technique capable of preventing a laser beam from irradiating to an incorrect position of a battery module due to malfunction of a laser welding apparatus.

DISCLOSURE

Technical Problem

The present disclosure is designed to solve the problems of the related art, and therefore the present disclosure is directed to providing a laser welding apparatus capable of preventing damage to a battery module caused by a laser beam.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a laser welding apparatus configured to weld an electrode lead of at least one secondary battery of a battery module and a main bus bar configured to electrically connect a plurality of secondary batteries to each other, the laser welding apparatus including: a laser beam emitting unit including a laser emitting element to irradiate a laser beam to the electrode lead and the main bus bar; a pressing jig including a pressing bar configured to move in a left-and-right direction such that the electrode lead is adhered to the main bus bar; and a blocking block blocking the laser beam generated in the laser beam emitting unit from reaching the at least one secondary battery or opened to allow the generated laser beam to pass therethrough, according to a position of the pressing bar moved in the left-and-right direction.

Also, the pressing jig may further include: a support having a fixed position and spaced apart from the pressing bar by a predetermined distance in the left-and-right direction; and an elastic member disposed between the pressing bar and the support.

Moreover, the blocking block may include: a blocking plate configured to be movable in a horizontal direction and having a plate shape elongated in an up-and-down direction; and a hinge connection member configured to be connected to one side of the blocking plate and having a bar shape elongated in the horizontal direction.

In addition, the hinge connection member may include: a connecting bar having one end portion hinge-connected to one side of the pressing bar and the other end portion hinge-connected to one side of the blocking plate; and a rotating center portion having a fixed position and hinge-connected to a center region of the connecting bar.

Also, the battery module may further include a pressurizing bus bar positioned opposite to a position of the main bus bar based on the electrode lead.

Moreover, the pressing bar may include a grip portion having a protruding structure that protrudes from one side in the left-and-right direction to where the pressurizing bus bar is positioned, so as to accommodate at least a portion of the pressurizing bus bar.

In addition, the laser beam emitting unit may be configured to irradiate the laser beam such that an end portion of the electrode lead protruding forward and a side portion of the main bus bar in the left-and-right direction are combined to each other, or configured to irradiate the laser beam such that an end portion of the electrode lead protruding forward and side portions of the main bus bar and the pressurizing bus bar in the left-and-right direction are combined to each other.

Moreover, the battery module may further include a bus bar frame configured such that the main bus bar and the pressurizing bus bar are mounted on a front surface, wherein the bus bar frame may include a guide protrusion provided at top and bottom of the pressurizing bus bar, protruding forward, and elongated in the left-and-right direction to guide movement of the pressurizing bus bar in the left-and-right direction.

Also, the laser welding apparatus may further include a jig transport unit connected to one side of the pressing bar and generating a moving force in a horizontal direction to move the pressing bar in the left-and-right direction.

Furthermore, the laser welding apparatus may further include: a base plate on which the pressing jig and the blocking block are mounted; and a module mounting portion extending in an upward direction from the base plate and opened such that the electrode lead of the battery module and the main bus bar are externally exposed.

In another aspect of the present disclosure, there is also provided a battery module manufacturing system including the laser welding apparatus.

Advantageous Effects

According to an aspect of the present disclosure, in a laser welding apparatus, even when a laser beam is generated and irradiated from a laser beam emitting unit while a pressing jig of a battery module is not positioned at a proper position due to malfunction, the generated laser beam is blocked by a blocking block, thereby preventing damage to or ignition of a pouch secondary battery included in the battery module.

Also, according to such an aspect of the present disclosure, the laser welding apparatus stably supports reaction force according to pressurizing force applied by a support to an electrode lead of an pressing bar, thereby stably adhering the electrode lead to a main bus bar.

In addition, according to an aspect of the present disclosure, a hinge connection member includes a connecting bar and a rotating center portion such that a moving force of a pressing bar in a left-and-right direction is converted to a moving force of moving a blocking plate in a horizontal direction, thereby enabling opening or closing of the blocking plate to determine transmission of a laser beam, according to movement of the pressing bar.

Also, according to an aspect of the present disclosure, a laser beam emitting unit may have high welding reliability since an end portion of an electrode lead may be combined to a side portion of a main bus bar while a pressurizing bus bar is pressurizing the end portion of the electrode lead.

Moreover, according to an aspect of the present disclosure, a laser welding apparatus may increase binding force between an electrode lead and a bus bar by welding both a pressurizing bus bar and a main bus bar, and an end portion of an electrode lead disposed therebetween, and thus a separation phenomenon between the electrode lead and the bus bar caused by an external impact may be reduced.

Also, according to another aspect of the present disclosure, in a laser welding apparatus, a blocking plate may systematically allow or block transmission of a laser beam according to movement of a pressing bar in a left-and-right direction, and thus damage to a battery module caused by malfunction of the laser beam apparatus may be effectively prevented.

Moreover, according to another aspect of the present disclosure, in a laser welding apparatus, by providing a pressing jig and a blocking block respectively at a top base plate and a bottom base plate, space utility occupied by internal components of the laser welding apparatus of the present disclosure may be effectively increased compared to when four pressing jigs and four blocking blocks are provided only at the bottom base plate.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
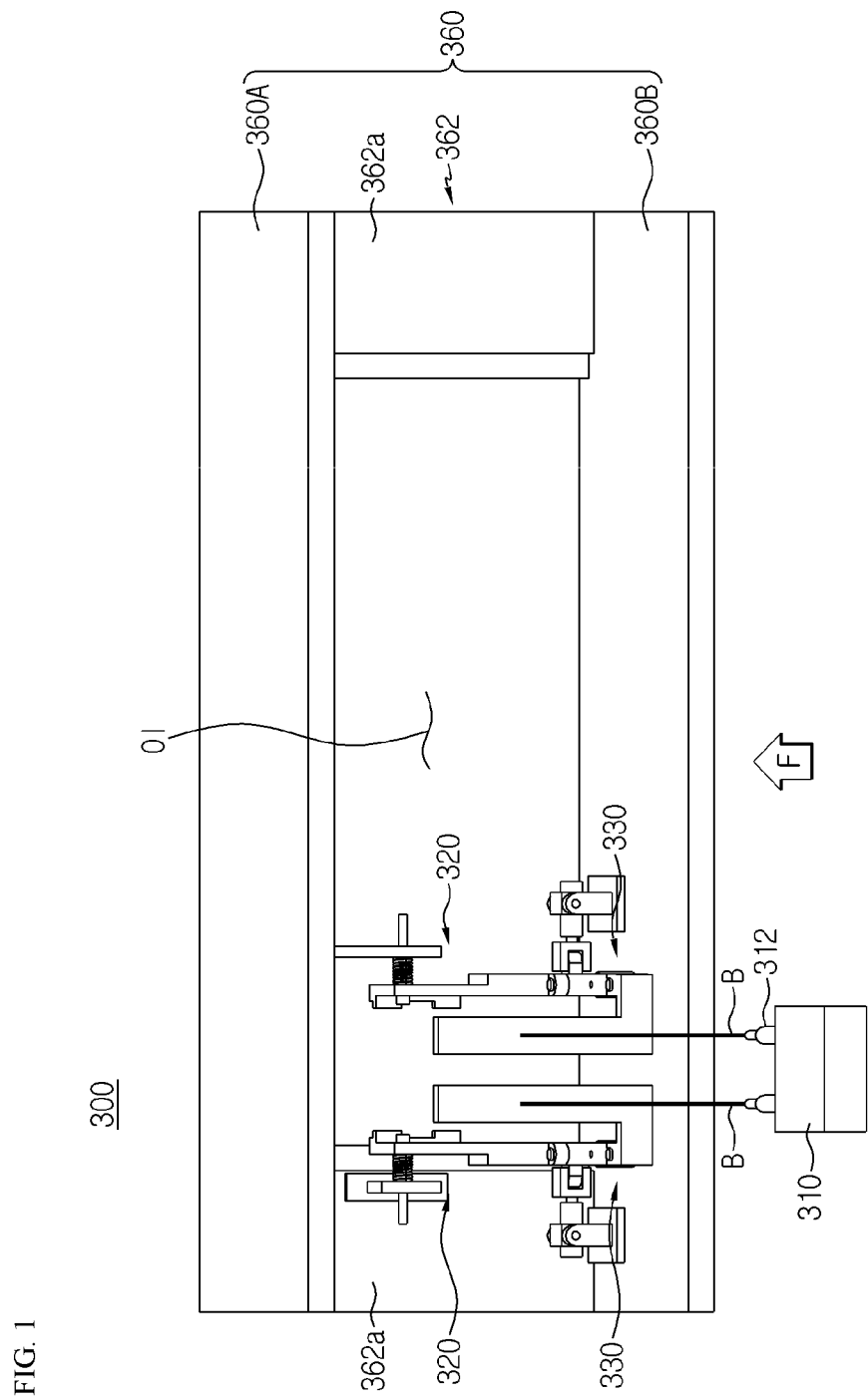
FIG. 1 is a front perspective view schematically showing a laser welding apparatus according to an embodiment of the present disclosure.
Figure 2:
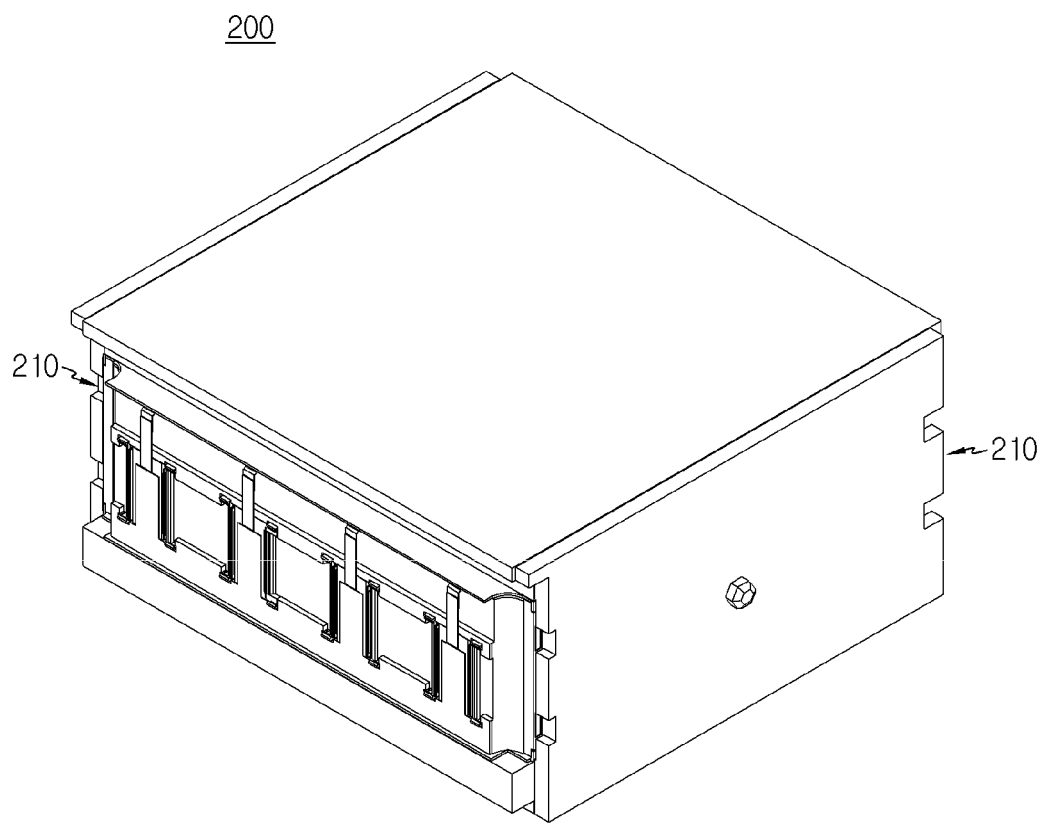
FIG. 2 is a perspective view schematically showing a battery module according to an embodiment of the present disclosure.
Figure 3:
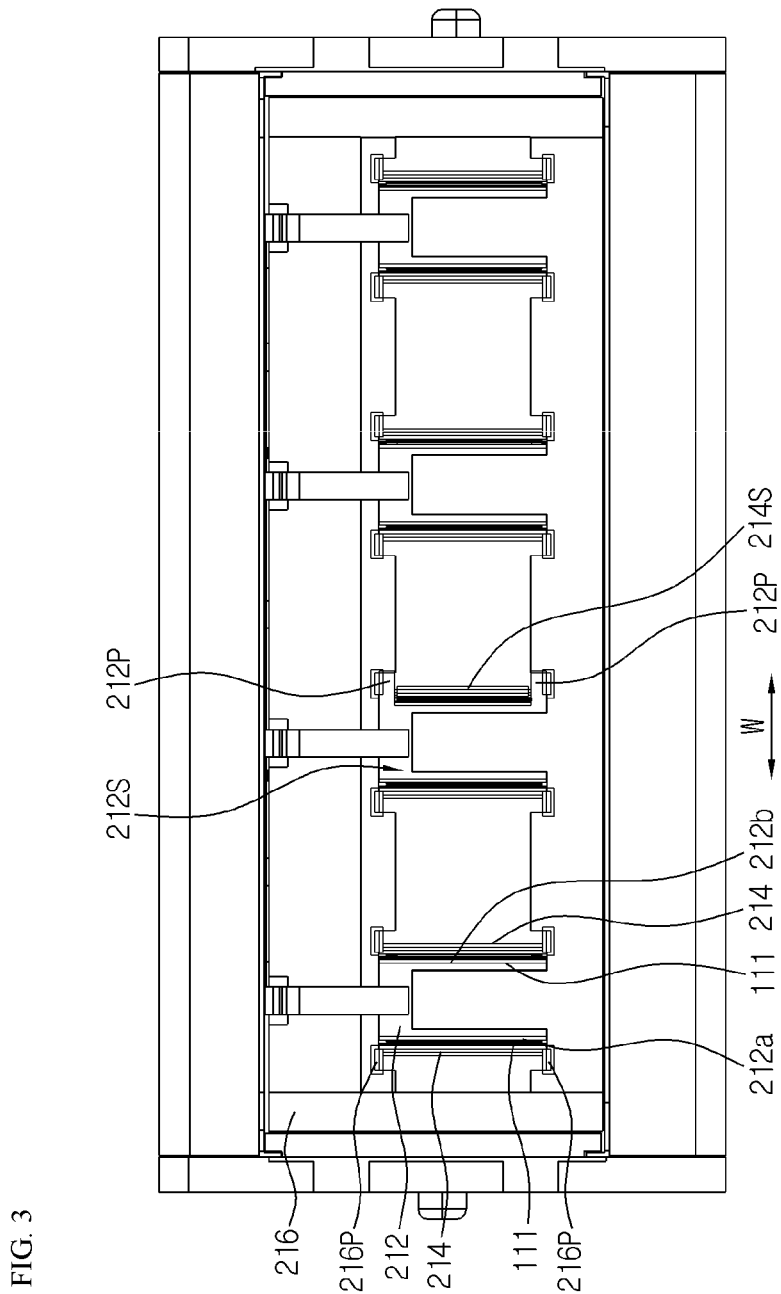
FIG. 3 is a front view schematically showing a battery module according to an embodiment of the present disclosure.
Figure 4:
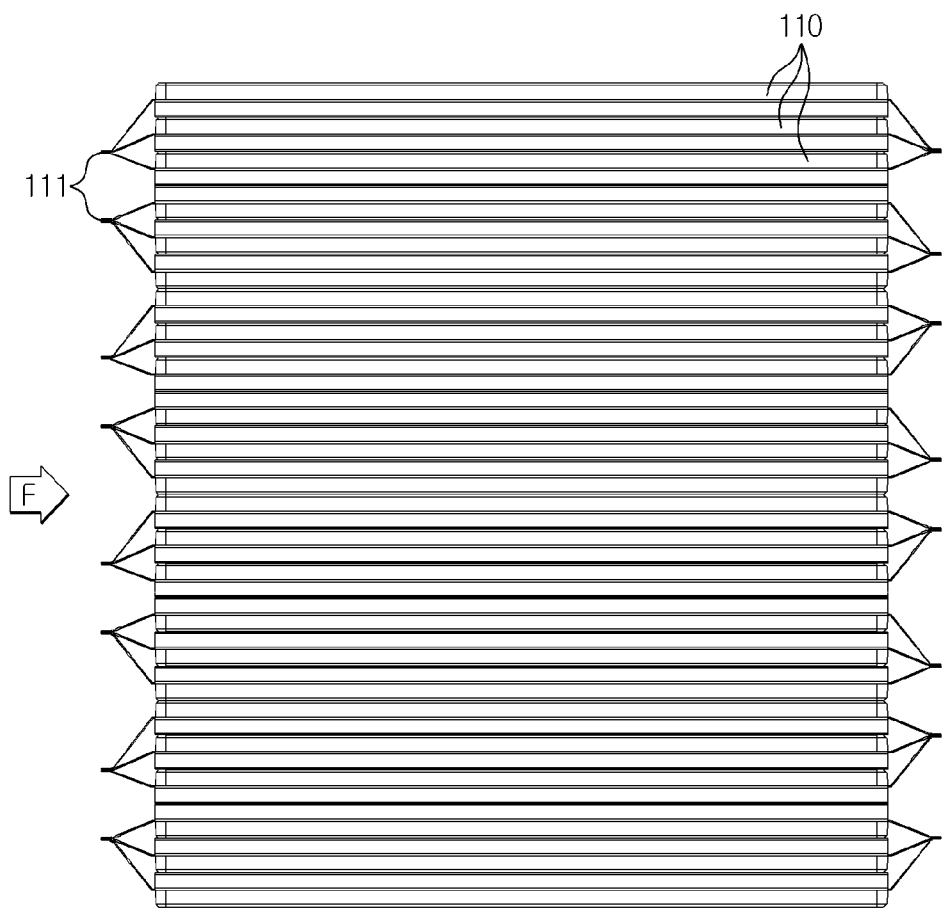
FIG. 4 is a plan view schematically showing a cell assembly that is a partial component of a battery module, according to an embodiment of the present disclosure.
Figure 5:
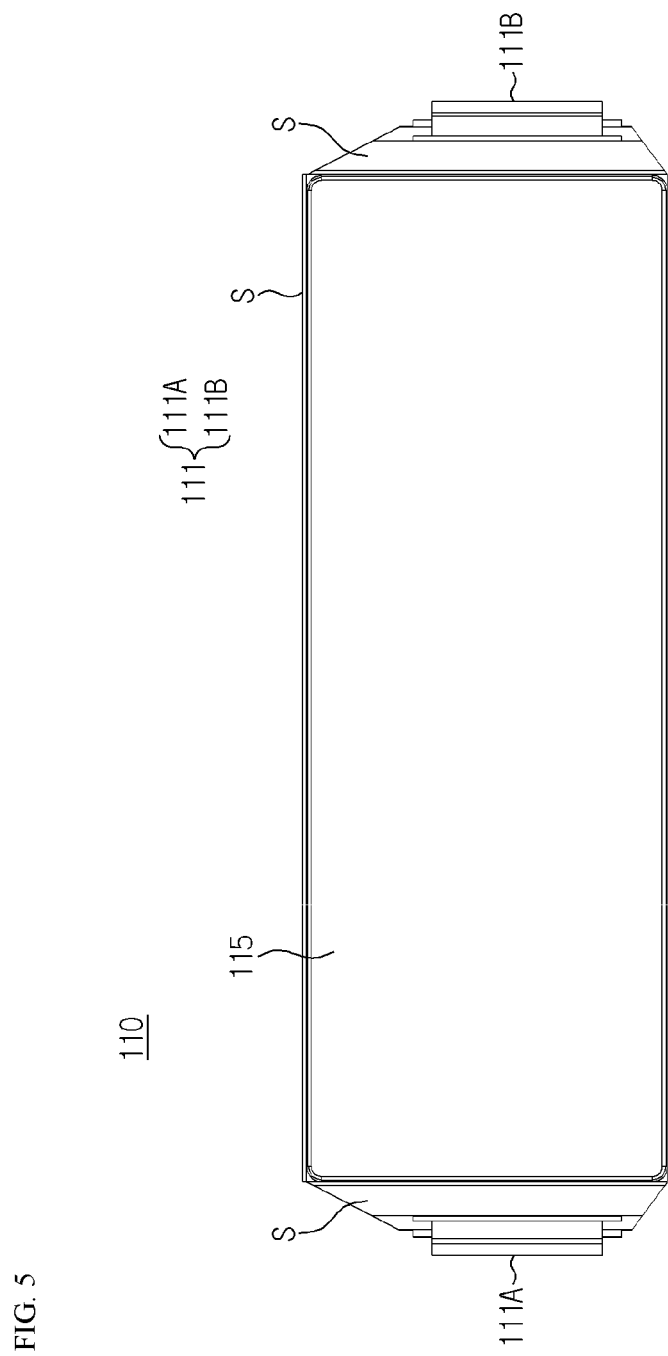
FIG. 5 is a side view schematically showing a pouch-type secondary battery that is a partial component of a battery module, according to an embodiment of the present disclosure.

FIG. 1 is a front perspective view schematically showing a laser welding apparatus according to an embodiment of the present disclosure. FIG. 2 is a perspective view schematically showing a battery module according to an embodiment of the present disclosure. FIG. 3 is a front view schematically showing a battery module according to an embodiment of the present disclosure. FIG. 4 is a plan view schematically showing a cell assembly that is a partial component of a battery module, according to an embodiment of the present disclosure. Also, FIG. 5 is a side view schematically showing a pouch-type secondary battery that is a partial component of a battery module, according to an embodiment of the present disclosure.

Referring to FIGS. 1 through 5, a laser welding apparatus 300 according to the present disclosure may be configured to weld an electrode lead 111 of at least one secondary battery 110 of a battery module 200 and a main bus bar 212 provided in a bus bar assembly 210 to each other.

Here, the battery module 200 may include a cell assembly 100.

In particular, the cell assembly 100 may include the plurality of secondary batteries 110. Also, the secondary battery 110 may be a pouch-type secondary battery 110. In particular, such a pouch-type secondary battery 110 may include an electrode assembly (not shown), an electrolyte (not shown), and pouch exterior material 115.

Here, the electrode assembly may be configured in a form in which at least one positive electrode plate and at least one negative electrode plate are arranged with a separator therebetween. In particular, the electrode assembly may be distinguished into a roll-type in which one positive electrode plate and one negative electrode plate are rolled together with a separator, and a stack-type in which a plurality of positive electrode plates and a plurality of negative electrode plates are alternately stacked with a separator therebetween.

Also, the pouch exterior material 115 may be configured in a form including an external insulating layer, a metal layer, and an internal adhesive layer. Such a pouch exterior material 115 may include a metal thin film, such as an aluminum thin film, so as to protect internal components, such as an electrode assembly, an electrolyte solution, etc., and improve heat dissipation and complementation with respect to electrochemical properties of the electrode assembly and the electrolyte solution.

Also, such an aluminum thin film may be disposed between insulating layers formed of an insulating material so as to secure electric insulation between components inside the secondary battery 110, such as the electrode assembly and the electrolyte solution, and other components outside the secondary battery 110.

In particular, the pouch exterior material 115 may be configured of two pouches provided on both sides in a horizontal direction based on a sealing portion, and at least one of the two pouches may have an internal space having a concave shape. The electrode assembly may be accommodated in such an internal space of the pouch exterior material 115. Also, sealing portions S are provided on outer circumferential surfaces of the two pouches and are welded to each other, thereby sealing the internal space where the electrode assembly is accommodated.

Each pouch-type secondary battery 110 may include the electrode lead 111, and the electrode lead 111 may include a positive electrode lead 111A and a negative electrode lead 111B.

In particular, the electrode lead 111 may protrude forward or backward from the sealing portion S positioned on the outer circumferential surface at the front or back of the pouch exterior material 115. Also, the electrode lead 111 may function as an electrode terminal of the secondary battery 110. For example, as shown in FIG. 5, the electrode lead 111A may protrude forward from the secondary battery 110, and the other electrode lead 111B may protrude backward from the secondary battery 110.

As such, according to such a configuration of the present disclosure, there is no interference between the positive electrode lead and the negative electrode lead in one secondary battery 110, and thus the area of the electrode lead 111 may be increased and a welding process between the electrode lead 111 and the main bus bar 212 may be facilitated.

Also, the plurality of pouch-type secondary batteries 110 may be included in the battery module 200 and stacked in at least one direction. For example, as shown in FIG. 4, the plurality of pouch-type secondary batteries 110 may be stacked in parallel in a left-and-right direction. Here, when viewed from a direction indicated by an arrow F of FIG. 4, each pouch-type secondary battery 110 may be arranged to be perpendicularly erected approximately on the ground such that two wide surfaces are respectively positioned at the left and the right and the sealing portions S are positioned at top, bottom, front, and back. In other words, each secondary battery 110 may be erected in an up-and-down direction.

Here, the terms indicating directions, such as front, back, left, right, up, and down, may vary according to a position of an observer, how a target is placed, or the like. However, in the present specification, for convenience of description, front, back, left, right, up, and down directions are distinguished based on the direction indicated by the arrow F.

Since the configuration of the pouch-type secondary battery 110 described above is obvious to one of ordinary skill in the art, further detailed descriptions thereof will be omitted herein. Also, the cell assembly 100 according to the present disclosure may employ various secondary batteries 110 well-known at the time of application of the present disclosure.

Referring back to FIG. 3, the main bus bar 212 may be welded to the plurality of electrode leads 111 to provide electric connection between the plurality of secondary batteries 110. In particular, the main bus bar 212 may include a metal material having high electric conductivity. For example, the metal material may include copper, aluminum, iron, nickel, or the like.

Referring back to FIGS. 1 through 4, the laser welding apparatus 300 of the present disclosure may include a laser beam emitting unit 310, a pressing jig 320, and a blocking block 330. However, the numbers of components of the laser welding apparatus 300 are not each limited to one but may be two or more based on the number of welding regions.

Here, the laser beam emitting unit 310 may include a laser emitting element 312 irradiating a laser beam B. Also, the laser beam emitting unit 310 may irradiate the laser beam B to the electrode lead 111 and the main bus bar 212. In other words, the laser beam emitting unit 310 may irradiate the laser beam B such that at least a region of the electrode lead 111 and a region of the main bus bar 212 are bonded to each other.

For example, as shown in FIGS. 1 and 3, the laser beam emitting unit 310 may irradiate the laser beam B towards a spot where the electrode lead 111 and the main bus bar 212 are bonded. Also, when viewed in the direction indicated by the arrow F, the laser beam emitting unit 310 may irradiate the laser beam B such that an end portion of the electrode lead 111 and a side portion of the main bus bar 212 in the left-and-right direction are bonded to each other.

Figure 6:
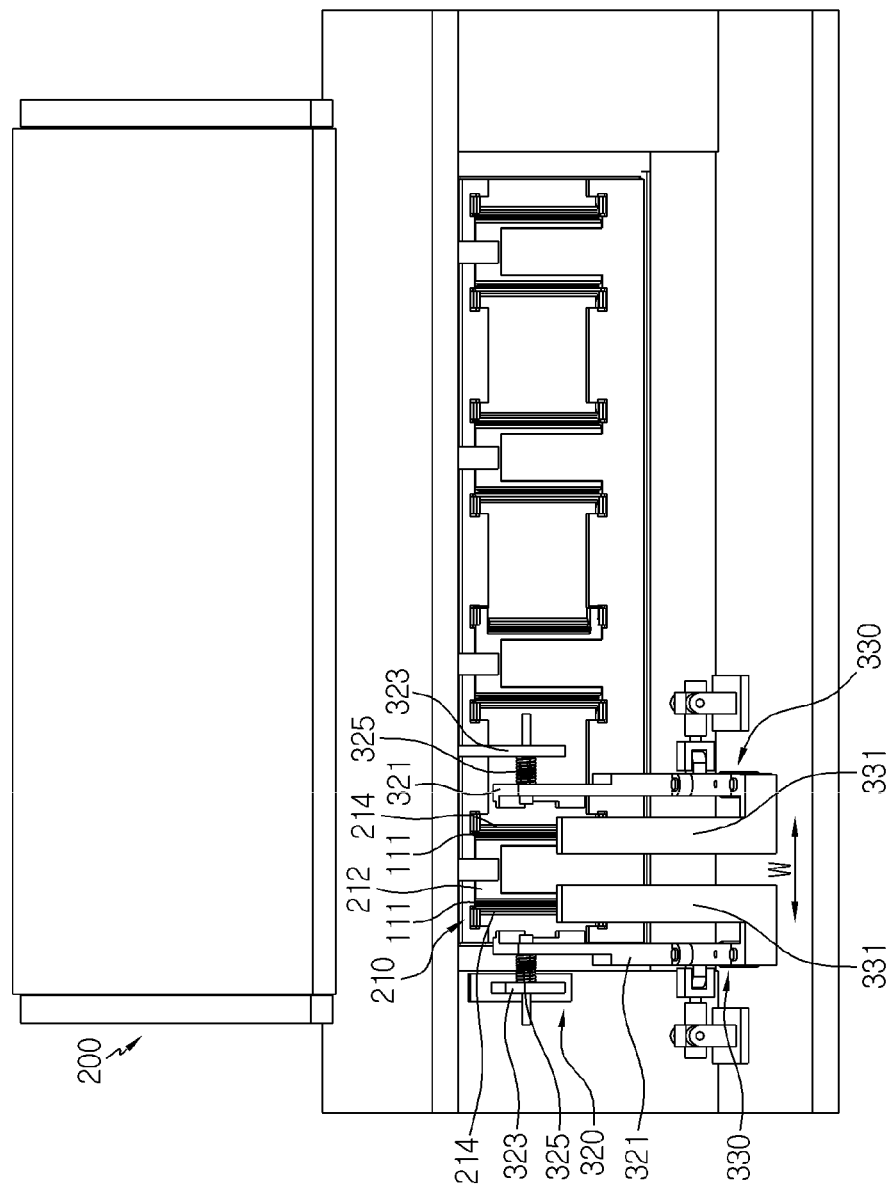
FIG. 6 is a front perspective view schematically showing a battery module being mounted on a laser welding apparatus, according to an embodiment of the present disclosure.

FIG. 6 is a front perspective view schematically showing a battery module being mounted on a laser welding apparatus, according to an embodiment of the present disclosure.

Referring to FIG. 6, the pressing jig 320 may include a pressing bar 321 configured to move in a left-and-right direction indicated by arrows W. However, the pressing bar 321 does not move only in the left-and-right direction, but may be configured to move also in a forward direction or a backward direction.

Also, the pressing bar 321 may be configured to transfer pressurizing force to one side of the electrode lead 111 such that the electrode lead 111 is adhered to the main bus bar 212. Here, the pressing bar 321 may directly contact and pressurize the one side of the electrode lead 111 or may indirectly transfer the pressurizing force via a separate member.

Also, the blocking block 330 may block the laser beam B generated in the laser beam emitting unit 310 from reaching the secondary battery 110, according to a position of the pressing bar 321 moved in the left-and-right direction.

In particular, when the pressing bar 321 is moved to a position where the electrode lead 111 is not pressurized, the blocking block 330 may be moved such that the laser beam B generated in the laser beam emitting unit 310 does not reach the secondary battery 110. In this case, the laser beam B may be irradiated to one surface of the blocking block 330 instead of the electrode lead 111 and the main bus bar 212. In other words, according to such a configuration, the present disclosure may prevent the laser beam B from being irradiated to an unintended region (battery module) via the blocking block 330.

On the other hand, when the pressing bar 321 is moved to a position where the electrode lead 111 is pressurized, the blocking block 330 may be moved such that the laser beam B generated in the laser beam emitting unit 310 reaches the electrode lead 111 and the main bus bar 212.

For example, as shown in FIG. 6, when the pressing bar 321 is moved to the position where the electrode lead 111 is not pressurized, the two blocking blocks 330 may be moved to inner positions of the two pressing bars 321 from a path of the left-and-right direction indicated by the arrows W such that the laser beam B is blocked. On the other hand, as will be described later with reference to FIG. 10, when the pressing bar 321 is moved to the position where the electrode lead 111 is pressurized, the two blocking blocks 330 may be moved such that the laser beam B is transmitted. This will be described in detail later.

As such, according to such a configuration of the present disclosure, even when the laser beam B is generated and irradiated from the laser beam emitting unit 310 while the pressing jig 320 of the battery module 200 is not positioned at a proper position due to malfunction of the laser welding apparatus 300, the blocking block 330 blocks the generated laser beam B, and thus damage to or ignition of the pouch-type secondary battery 110 included in the battery module 200 may be prevented.

Referring back to FIG. 6, the pressing jig 320 may include a support 323 having a fixed position such as to support force of reaction (force in an opposite direction) of pressurizing force, when the pressing bar 321 transfers the pressurizing force in which the electrode lead 111 is adhered to the main bus bar 212.

Also, the support 323 may be spaced apart from the pressing bar 321 by a predetermined distance in the left-and-right direction. Also, an elastic member 325 may be disposed between the pressing bar 321 and the support 323. In other words, the elastic member 325 may generate force in which the pressing bar 321 elastically pressurizes the electrode lead 111. In addition, the elastic member 325 may buffer the force of reaction according to the pressurizing force of the pressing bar 321.

For example, as shown in FIG. 6, the pressing bar 321 may be provided to each of the two pressing jigs 320. Also, the support 323 may be provided at a position spaced apart from the pressing bar 321 by a predetermined distance in the left-and-right direction indicated by the arrows W. Moreover, the elastic member 325 may be disposed between the pressing bar 321 and the support 323.

As such, according to such a configuration of the present disclosure, the support 323 stably supports the reaction force according to the pressurizing force in which the pressing bar 321 adheres the electrode lead 111 to the main bus bar 212, and thus the adhesion between the electrode lead 111 and the main bus bar 212 may be stably achieved.

Also, since the elastic member 325 is able to buffer the reaction force according to the pressurizing force, damage to the electrode lead 111 caused by the pressurizing force may be minimized. Moreover, the elastic member 325 may assist the pressing bar 321 to uniformly pressurize the electrode lead 111 without the pressurizing force being concentrated at one spot of pressurizing region of the electrode lead 111.

Referring back to FIG. 6, the blocking block 330 may include a blocking plate 331.

In particular, the blocking plate 331 may be configured to be movable in the horizontal direction. Also, the blocking plate 331 may be moved in the horizontal direction such as to deviate from a position directly facing a region where laser welding is required or to move to the position directly facing the region where laser welding is required. For example, the blocking plate 331 may be moved in a left direction and forward direction or moved in a right direction and forward direction.

For example, as shown in FIG. 6, the laser welding apparatus 300 may include the two blocking blocks 330. Also, the blocking plate 331 may be provided to each of the two blocking blocks 330. Here, the blocking plate 331 provided at the left may be configured to be movable in front-back-left-right directions based on the movement of the pressing bar 321 in the left-and-right direction. The remaining blocking plate 331 provided at the right may be configured to be movable in front-back-left-right directions based on the movement of the pressing bar 321 in the left-and-right direction.

Also, the blocking plate 331 may have a plate shape elongated in the up-and-down direction. Moreover, a bottom portion of the blocking plate 331 may be elongated in the left-and-right direction. In other words, the blocking plate 331 may have a top portion of the plate shape elongated in the up-and-down direction and the bottom portion elongated in the left-and-right direction.

For example, as shown in FIG. 6, among the two blocking plates 331, the blocking plate 331 provided at the left may have the top portion of the plate shape extending in the up-and-down direction and the bottom portion extending in the left direction. Also, the blocking plate 331 provided at the right may have the top portion of the plate shape extending in the up-and-down direction and the bottom portion extending in the right direction. In other words, when viewed from the direction indicated by the arrow F of FIG. 1, the blocking plate 331 may have an 'L' shape.

As such, according to such a configuration of the present disclosure, the top portion of the blocking plate 331 may effectively block the generated laser beam B by using the plate shape extending in the up-and-down direction. Also, the bottom portion of the blocking plate 331 is configured suitably such that the blocking plate 331 is movable to allow transmission of the laser beam B.

Figure 7:
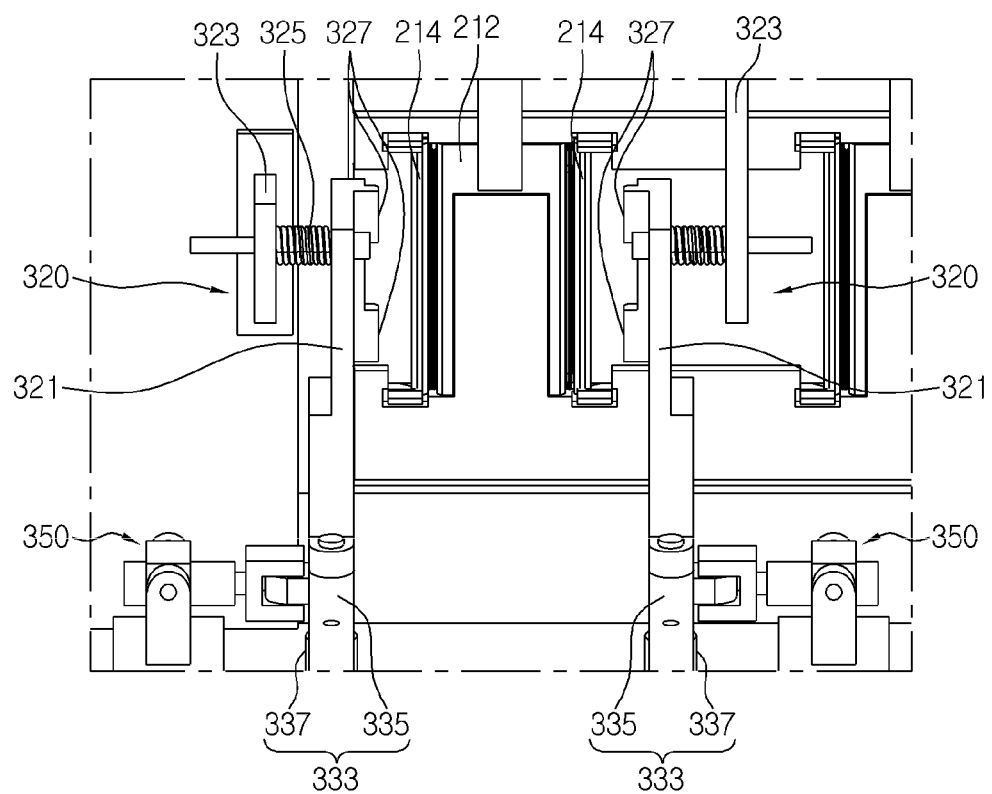
FIG. 7 is a partial enlarged view schematically showing some components of a laser welding apparatus, according to an embodiment of the present disclosure.

FIG. 7 is a partial enlarged view schematically showing some components of a laser welding apparatus, according to an embodiment of the present disclosure. Also, FIG. 8 is a partial plan view schematically showing some components of a laser welding apparatus, according to an embodiment of the present disclosure.

Figure 8:
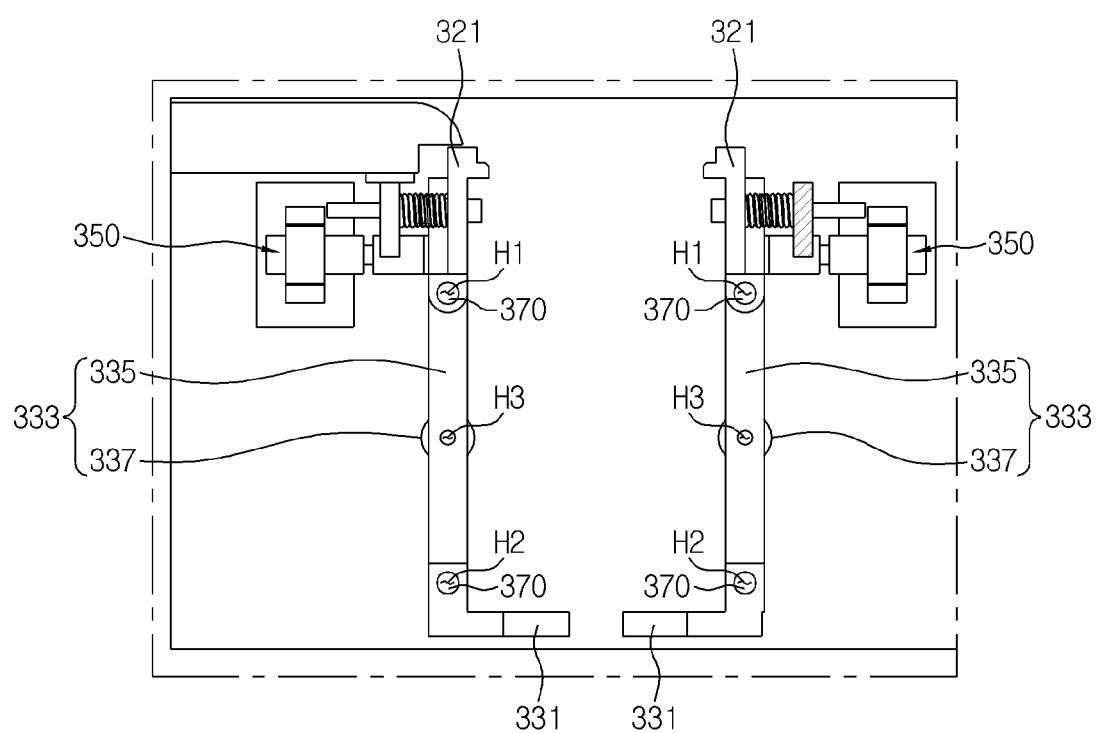
FIG. 8 is a partial plan view schematically showing some components of a laser welding apparatus, according to an embodiment of the present disclosure.

Referring to FIGS. 7 and 8 together with FIG. 6, the blocking block 330 may further include a hinge connection member 333.

In particular, the hinge connection member 333 may be connected to one side of the blocking plate 331 to transfer force of moving a position of the blocking plate 331. Also, the hinge connection member 333 may have a bar shape elongated in the horizontal direction. More particularly, the hinge connection member 333 may have a bar shape elongated in the front-and-back direction from the horizontal direction.

Also, the hinge connection member 333 may be configured such that a moving force of the pressing bar 321 in the left-and-right direction is converted to a moving force of the blocking plate 331 moving in the horizontal direction. In particular, the hinge connection member 333 may include a connecting bar 335 and a rotating center portion 337.

Here, one end portion (rear end portion) of the connecting bar 335 may be hinge-connected to one side of the pressing bar 321. Here, the hinge connection means that two combined members are configured to be rotatable while being connected to each other without restricting each other's movement (motion).

Also, a penetrating hole H1 may be provided at the one end portion of the connecting bar 335 such as to be hinge-rotatable with the one side of the pressing bar 321.

In addition, a penetrating hole H1 may also be provided at the one side of the pressing bar 321 to which the one end portion of the connecting bar 335 is combined. Also, a bolt 370 may be inserted into the penetrating hole H1 provided at each of the one end portion of the connecting bar 335 and the one side of the pressing bar 321 such that the connecting bar 335 and the pressing bar 321 are hinge-connected to each other.

Moreover, the other end portion of the connecting bar 335 may be hinge-connected to one side of the blocking plate 331. Also, a penetrating hole H2 may be provided to the other end portion of the connecting bar 335 such as to be hinge-rotatable with the one side of the blocking plate 331.

In addition, the penetrating hole H2 may also be provided at the one side of the blocking plate 331 to which the other end portion of the connecting bar 335 is combined. Also, the bolt 370 may be inserted into the penetrating hole H2 provided at each of the other end portion of the connecting bar 335 and the one side of the blocking plate 331 such that the connecting bar 335 and the blocking plate 331 are hinge-connected to each other.

For example, as shown in FIG. 8, the laser welding apparatus 300 may include two hinge connection members 333. Also, the hinge connection member 333 includes the connecting bar 335 having the one end portion hinge-connected to the one side of the pressing bar 321 and the other end portion hinge-connected to the one side of the blocking plate 331.

Also, the hinge connection member 333 may include the rotating center portion 337 hinge-connected to the center of the connecting bar 335. In addition, the rotating center portion 337 may be configured that a position thereof is fixed. In other words, the rotating center portion 337 may be configured such as to be hinge-connected to the center of the connecting bar 335 and such that the position thereof is fixed, and thus the rotating center portion 337 may function as a rotating shaft of a rotating movement of the connecting bar 335 in the horizontal direction.

In this regard, an inserting hole H3 may be provided at the center of the connecting bar 335, and the rotating shaft of the rotating center portion 337 may be inserted into the inserting hole H3.

As such, according to such a configuration of the present disclosure, the hinge connection member 333 includes the connecting bar 335 and the rotating center portion 337, which are configured to convert the moving force of the pressing bar 321 in the left-and-right direction to the moving force of the blocking plate 331 in the horizontal direction, thereby enabling opening or closing of the blocking plate 331 to determine transmission of the laser beam B, according to movement of the pressing bar 321.

Accordingly, the opening and closing of the blocking plate 331 are systematically changed according to the position of the pressing bar 321 without having to use a configuration of a complicated structure, and thus damage to the battery module 200 caused by the laser beam B may be effectively prevented.

Referring back to FIG. 7 together with FIGS. 2 and 3 again, the bus bar assembly 210 of the battery module 200 may further include a pressurizing bus bar 214.

In particular, the pressurizing bus bar 214 may be positioned opposite to the position of the main bus bar 212 in the left-and-right direction, based on the electrode lead 111. Also, the pressurizing bus bar 214 may be configured to pressurize one side of the electrode lead 111 in the left-and-right direction such that the electrode lead 111 is adhered to one side of the main bus bar 212 in the left-and-right direction.

In addition, the pressurizing bus bar 214 may include a metal material having high electric conductivity. For example, the metal material may include copper, aluminum, iron, nickel, or the like.

For example, as shown in FIG. 3, the electrode lead 111 may be positioned at each of both sides of one main bus bar 212 in the left-and-right direction. Also, the pressurizing bus bar 214 may be positioned opposite to the position of the main bus bar 212 based on the electrode lead 111. In other words, the electrode lead 111 may be disposed between the main bus bar 212 and the pressurizing bus bar 214.

Referring back to FIGS. 7 and 8, the pressing bar 321 may include a grip portion 327 having a protruding structure that protrudes in a direction where the pressurizing bus bar 214 is positioned. In other words, the grip portion 327 may have the protruding structure at one region of the pressing bar 321 contacting the pressurizing bus bar 214 so as to accommodate at least a region of the pressurizing bus bar 214. Also, the grip portion 327 may be provided at a left portion or a right portion of the pressing bar 321.

For example, as shown in FIG. 7, when viewed from the direction indicated by the arrow F of FIG. 1, among the two pressing bars 321, the grip portion 327 of the pressing bar 321 positioned at the left may have two protruding structures protruding in a right direction from the left portion. Also, the grip portion 327 of the pressing bar 321 positioned at the right may have two protruding structures protruding in a left direction from the right portion. The two pressing bars 321 may be configured such as to pressurize the adjacent pressurizing bus bar 214 in the left-and-right direction by using the grip portion 327.

Referring back to FIGS. 1 and 3, the laser beam emitting unit 310 of the present disclosure may be configured to irradiate the laser beam B such that the end portion of the electrode lead 111 protruding forward and the side portion of the main bus bar 212 in the left-and-right direction are combined to each other.

For example, the end portion protruding in front of the electrode lead 111 may be positioned at each of both sides of one main bus bar 212. In this case, the laser beam emitting unit 310 may irradiate the laser beam B to combine a right surface of the end portion of the electrode lead 111 positioned at the left based on the main bus bar 212 and a left portion 212a of the main bus bar 212 to each other.

Also, the laser beam emitting unit 310 may irradiate the laser beam B to combine a left surface of the end portion of the electrode lead 111 positioned at the right based on the main bus bar 212 and a right portion 212b of the main bus bar 212 to each other.

As such, according to such a configuration of the present disclosure, the laser beam emitting unit 310 may have high welding reliability because the end portion of the electrode lead 111 is combined to the side portion of the main bus bar 212 in the left-and-right direction while the pressurizing bus bar 214 is pressurizing the end portion of the electrode lead 111.

Also, the laser beam emitting unit 310 may irradiate the laser beam B such that the end portion of the electrode lead 111 protruding forward and the side portion of each of the main bus bar 212 and pressurizing bus bar 214 in the left-and-right direction are combined to each other.

For example, the laser beam emitting unit 310 may irradiate the laser beam B to combine the end portion of the electrode lead 111 positioned at the left based on the main bus bar 212 to a right portion of the pressurizing bus bar 214 and the left portion 212a of the main bus bar 212 positioned at the left of the electrode lead 111.

Also, the laser beam emitting unit 310 may irradiate the laser beam B to combine the end portion of the electrode lead 111 positioned at the right based on the main bus bar 212 to a left portion of the pressurizing bus bar 214 and the right portion 212b of the main bus bar 212 positioned at the right of the electrode lead 111.

As such, according to such a configuration of the present disclosure, compared to when only the main bus bar 212 and the end portion of the electrode lead 111 are combined to each other, binding force may be increased by welding all of the pressurizing bus bar 214, the main bus bar 212, and the end portion of the electrode lead 111 disposed therebetween, and thus detachment between the electrode lead 111 and the bus bar caused by an external impact may be prevented.

Also, a main bus bar 212S of another form may have a contacting structure contacting one region of the pressurizing bus bar 214. For example, a top portion and a bottom portion of the main bus bar 212S may each have an extending portion 212P extending in the left-and-right direction to contact the top and bottom of a pressurizing bus bar 214S.

As such, according to such a configuration of the present disclosure, the extending portion 212P of the main bus bar 212S increases the area of an electric path between the electrode lead 111 and the main bus bar 212S, thereby effectively reducing electric resistance of the electric path between the electrode lead 111 and the main bus bar 212S.

Figure 9:
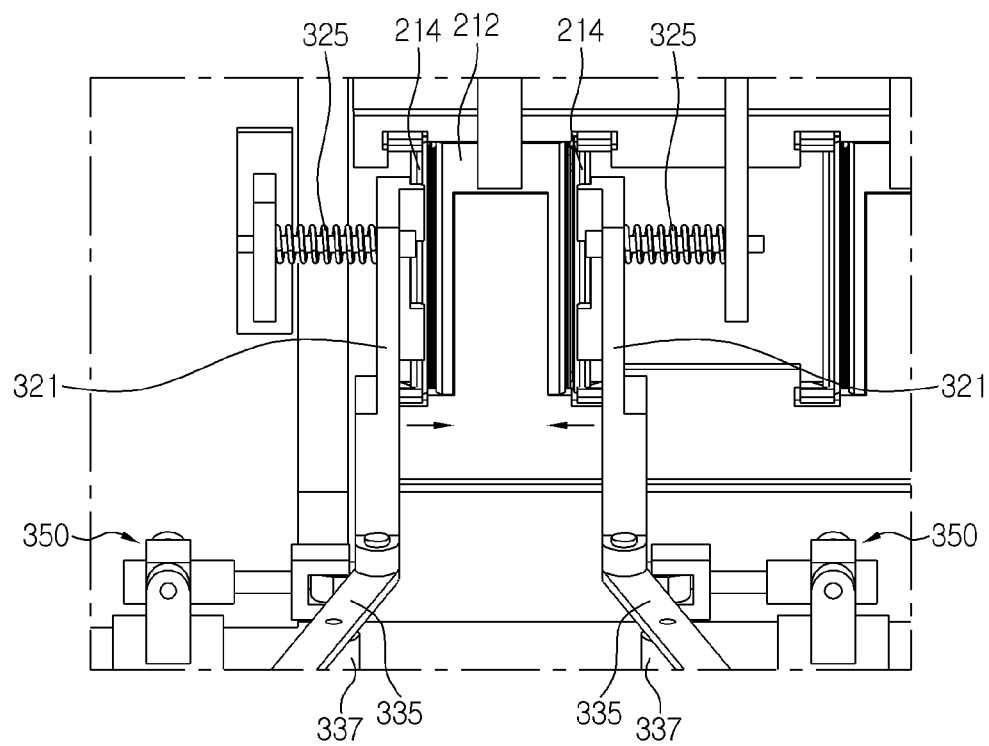
FIG. 9 is a partial enlarged view schematically showing some components for explaining operations of a laser welding apparatus, according to an embodiment of the present disclosure.

FIG. 9 is a partial enlarged view schematically showing some components for explaining operations of a laser welding apparatus, according to an embodiment of the present disclosure. Also, FIG. 10 is a partial plan view schematically showing some components for explaining operations of a laser welding apparatus, according to an embodiment of the present disclosure.

Figure 10:
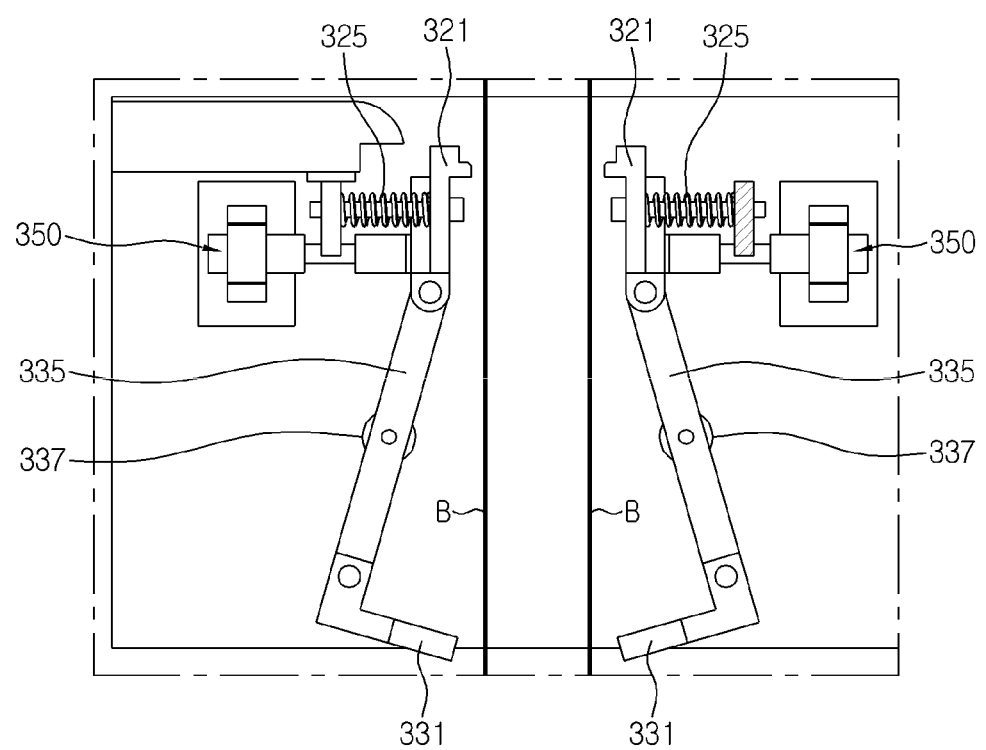
FIG. 10 is a partial plan view schematically showing some components for explaining operations of a laser welding apparatus, according to an embodiment of the present disclosure.

Referring to FIGS. 9 and 10 together with FIG. 1, the laser welding apparatus 300 may include a jig transport unit 350 moving the pressing bar 321 in the left-and-right direction.

In particular, the jig transport unit 350 may be configured to move the pressing bar 321 in the left-and-right direction. Here, the blocking plate 331 may be transported in a direction opposite to a direction where the pressing bar 321 is transported. In other words, the connecting bar 335 connected to one side of the pressing bar 321 and one side of the blocking plate 331 may transport the blocking plate 331 in the direction opposite to a moving direction of the pressing bar 321.

Accordingly, when the pressing bar 321 is moved to pressurize one side of the pressurizing bus bar 214 by the jig transport unit 350, the blocking plate 331 may be moved in the left direction or the right direction such that the laser beam B reaches the electrode lead 111 and the main bus bar 212.

For example, as shown in FIG. 10, among the two pressing bars 321, when the pressing bar 321 positioned at the left is moved to the right direction, the blocking plate 331 is moved to the left direction by the connecting bar 335, thereby allowing transmission of the laser beam B. Also, among the two pressing bars 321, when the pressing bar 321 positioned at the right is moved to the left direction, the blocking plate 331 is moved to the right direction by the connecting bar 335, thereby allowing transmission of the laser beam B.

As such, according to such a configuration of the present disclosure, since the blocking plate 331 may systematically allow or block transmission of the laser beam B according to movement of the pressing bar 321 in the left-and-right direction, damage to the battery module 200 caused by malfunction of the laser welding apparatus 300 may be effectively prevented.

Also, the jig transport unit 350 may include a transport unit generating a moving force in the horizontal direction (left-and-right direction). For example, the transport unit may be a hydraulic cylinder that enables a piston or plunger to reciprocate in a straight line to perform a mechanical operation via hydraulic pressure. Alternatively, the transport unit may be an electric cylinder moving a piston in the left-and-right direction.

Also, the jig transport unit 350 may be connected to one side of the pressing bar 321 in the left-and-right direction. Moreover, one end portion of the piston or plunger of the hydraulic cylinder may be connected to the pressing bar 321. Accordingly when the hydraulic pressure is applied to or removed from the hydraulic cylinder, the piston or plunger moves in the left-and-right direction, thereby moving the pressing bar 321 in the left-and-right direction. Here, a hydraulic apparatus for applying or removing the hydraulic pressure to or from the hydraulic cylinder is not separately illustrated, a generally used hydraulic apparatus is applicable.

Also, the pressing bar 321 that moved in the left-and-right direction may be configured to pressurize one region of the pressurizing bus bar 214. In particular, the bottom portion of the pressing bar 321 may be moved in the left-and-right direction by the moving force of the jig transport unit 350 in the horizontal direction. Also, the top portion of the pressing bar 321 may be configured to pressurize the pressurizing bus bar 214 according to elastic force of the elastic member 325 of FIG. 6.

As shown in FIGS. 1 and 9, the laser welding apparatus 300 may include the two jig transport units 350. Also, among the two jig transport units 350, the jig transport unit 350 positioned at the left may be configured to transport the pressing bar 321 in the right direction and the jig transport unit 350 positioned at the right may be configured to transport the pressing bar 321 in the left direction.

As such, according to such a configuration of the present disclosure, the jig transport unit 350 includes the transport unit capable of precisely transporting the pressing bar 321 in the left-and-right direction, and the pressing jig 320 elastically pressurizes the pressing bar 321 such that the electrode lead 111 is adhered to one side of the main bus bar 212 by the elastic member 325, thereby enabling force applied by the pressing bar 321 to the electrode lead 111 to be uniformly transmitted without being biased towards one spot.

Referring back to FIG. 1, the laser welding apparatus 300 may include a base plate 360 and a module mounting portion 362.

In particular, the base plate 360 may have a laying plate shape configured such that top and bottom surfaces are relatively wide compared to side surfaces in the horizontal direction. Also, the pressing jig 320, the jig transport unit 350, and the blocking block 330 may be mounted on the top surface or bottom surface of the base plate 360.

Moreover, the laser welding apparatus 300 may include two base plates 360 respectively positioned at the top portion and the bottom portion. As such, by providing the base plate 360 not only at the bottom portion but also at the top portion of the laser welding apparatus 300, the laser beam B outside a set range may be prevented from being irradiated to the outside.

Moreover, the module mounting portion 362 may include a side wall 362a extending from the base plate 360 in the upward direction or the downward direction. Also, the module mounting portion 362 may include an opening O1 such that the main bus bar 212 and the electrode lead 111 of the battery module 200 are exposed to the laser beam emitting unit 310. In other words, the module mounting portion 362 may locate a region of the battery module 200 that is to be welded in the opening O1 to be exposed therethrough.

For example, as shown in FIG. 1, a top base plate 360A and a bottom base plate 360B may be provided at the top portion and the bottom portion of the laser welding apparatus 300. Also, the module mounting portion 362 may be provided between the top base plate 360A and the bottom base plate 360B and at the back. Here, the module mounting portion 362 may be arranged to be adjacent to the bus bar assembly 210 of the battery module 200.

Moreover, the module mounting portion 362 may include the two side walls 362a connecting the top base plate 360A and the bottom base plate 360B. Also, between the two side walls 362a, the opening O1 may be provided to externally expose the main bus bar 212 and the electrode lead 111 of the battery module 200.

Referring back to FIGS. 2 and 3, the bus bar assembly 210 of the battery module 200 may further include a bus bar frame 216 configured to mount the main bus bar 212 and the pressurizing bus bar 214 on a front surface.

In particular, the bus bar frame 216 may include an electric insulating material. The electric insulating material may be, for example, electric insulating plastic.

Also, the bus bar frame 216 may include a guide protrusion 216P to guide movement of the pressurizing bus bar 214 in the left-and-right direction. Moreover, the guide protrusion 216P may be provided to each of the top portion and the bottom portion of the pressurizing bus bar 214. Also, the guide protrusion 216P may be formed to protrude forward from an outer surface of the bus bar frame 216 or may be elongated in the left-and-right direction.

For example, as shown in FIG. 3, 16 guide protrusions 216P may be provided on the outer surface of the bus bar frame 216. Also, the 16 guide protrusions 216P may be positioned to contact the top portion or bottom portion of the pressurizing bus bar 214.

As such, according to such a configuration of the present disclosure, the guide protrusion 216P provided at the bus bar frame 216 guides the movement of the pressurizing bus bar 214 in the left-and-right direction by pressurization of the pressing bar 321 of the laser welding apparatus 300, and thus the pressurizing bus bar 214 may easily pressurize the side portion of the end portion of the electrode lead 111 in the left-and-right direction and the pressurizing bus bar 214 may be prevented from being deviated from the bus bar frame 216.

Figure 11:
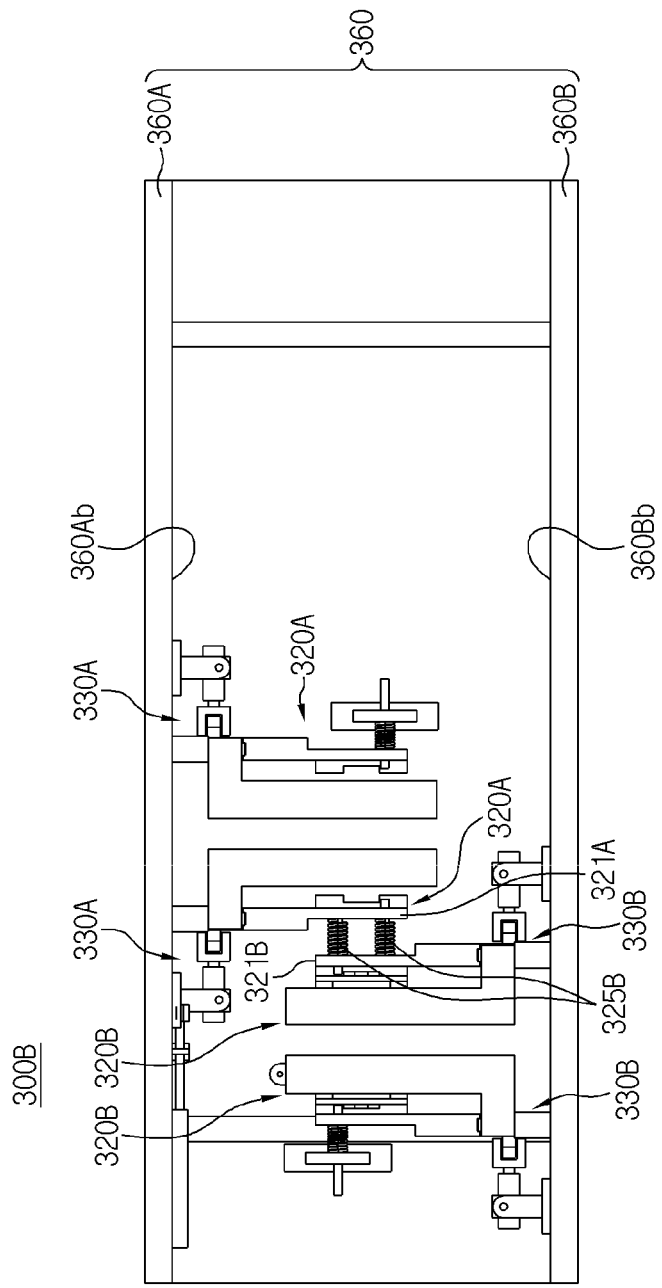
FIG. 11 is a perspective view schematically showing a laser welding apparatus according to another embodiment of the present disclosure.

FIG. 11 is a perspective view schematically showing a laser welding apparatus according to another embodiment of the present disclosure.

Referring to FIG. 11, a laser welding apparatus 300B according to another embodiment of the present disclosure includes the top base plate 360A and the bottom base plate 360B. Also, a pressing jig 320B and a blocking block 330B may be mounted on a top surface of the bottom base plate 360B. Moreover, a pressing jig 320A and a blocking block 330A may be mounted on a bottom surface 360Ab of the top base plate 360A.

Here, the pressing jig 320A mounted at the bottom portion of the top base plate 360A may include a pressing bar 321A. Also, the pressing bar 321A may have a structure connected to a pressing bar 321B of the pressing jig 320B mounted at the top portion of the bottom base plate 360B.

Moreover, two elastic members 325B may be provided between the pressing bar 321A mounted on the top base plate 360A and the pressing bar 321B mounted on the bottom base plate 360B. Also, the two elastic members 325B may respectively generate force of the pressing bar 321B mounted on the bottom base plate 360B pressurizing in the left direction and force of the pressing bar 321A mounted on the top base plate 360A pressurizing in the right direction.

For example, as shown in FIG. 11, two pressing jigs 320B and two blocking blocks 330B may be mounted on the top surface 360Bb of the bottom base plate 360B. Moreover, two pressing jigs 320A and two blocking blocks 330A may be mounted on the bottom surface 360Ab of the top base plate 360A.

As such, according to such a configuration of the present disclosure, by mounting the pressing jig 320 and the blocking block 330 on each of the top base plate 360A and the bottom base plate 360B, space utility occupied by internal components of the laser welding apparatus 300 may be effectively increased compared to when four pressing jigs 320B and four blocking blocks 330B are mounted only on the bottom base plate 360B. Moreover, by connecting the two pressing bars 321A and 321B to each other, a separate configuration of a support may be omitted, and thus manufacturing costs of the laser welding apparatus 300 may be reduced.

Meanwhile, the present disclosure may also provide a battery module manufacturing system. In particular, the battery module manufacturing system may include the laser welding apparatus and a computer apparatus controlling operations of the laser welding apparatus.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the scope of the present disclosure as defined by the following claims.

LIST OF REFERENCE NUMERALS

| | |
|---|---|
| 100: Cell Assembly | 110: Secondary Battery |
| 111: Electrode Lead | 200: Battery Module |
| 210: Bus Bar Assembly | 212: Main Bus Bar |
| 214: Pressurizing Bus Bar | 216: Bus Bar Frame |
| 300: Laser Welding Apparatus | B: Laser Beam |
| 310: Laser Beam Emitting Unit | |
| 320: Pressing jig | 321: Pressing bar |
| 327: Grip Portion | 323: Support |
| 325: Elastic Member | |
| 330: Blocking Block | 331: Blocking Plate |
| 333: Hinge Connection Member | 335: Connecting Bar |
| 337: Rotating Center Portion | 350: Jig Transport Unit |
| 360: Base Plate | 362: Module Mounting Portion |

INDUSTRIAL APPLICABILITY

The present disclosure relates to a laser welding apparatus and a battery module manufacturing system including the laser welding apparatus. Also, the present disclosure is applicable to manufacturing industries manufacturing a battery module including a plurality of secondary batteries.

What is claimed is:

1. A laser welding apparatus configured to weld an electrode lead of at least one secondary battery of a battery module and a main bus bar configured to electrically connect a plurality of secondary batteries to each other, the laser welding apparatus comprising:
    a laser beam emitting unit comprising a laser emitting element to irradiate a laser beam to the electrode lead and the main bus bar;
    a pressing jig comprising a pressing bar configured to move in a left-and-right direction such that the electrode lead is adhered to the main bus bar, a support having a fixed position and spaced apart from the pressing bar by a predetermined distance in the left-and-right direction, and an elastic member having elasticity and disposed between the pressing bar and the support; and
    a blocking block movable to block the laser beam generated in the laser beam emitting unit from reaching the at least one secondary battery or movable to allow the generated laser beam to pass therethrough, according to a position of the pressing bar moved in the left-and-right direction.

2. The laser welding apparatus of claim 1, wherein the blocking block comprises:
    a blocking plate configured to be movable in a horizontal direction and having a plate shape elongated in an up-and-down direction; and
    a hinge connection member configured to be connected to one side of the blocking plate and having a bar shape elongated in the horizontal direction.

3. The laser welding apparatus of claim 2, wherein the hinge connection member comprises:
    a connecting bar having one end portion hinge-connected to one side of the pressing bar and the other end portion hinge-connected to one side of the blocking plate; and
    a rotating center portion having a fixed position and hinge-connected to a center region of the connecting bar.

4. The laser welding apparatus of claim 3, wherein the battery module further comprises a pressurizing bus bar positioned opposite to a position of the main bus bar based on the electrode lead.

5. The laser welding apparatus of claim 4, wherein the pressing bar comprises a grip portion having a protruding structure that protrudes from one side in the left-and-right direction to where the pressurizing bus bar is positioned, so as to accommodate at least a portion of the pressurizing bus bar.

6. The laser welding apparatus of claim 4, wherein the laser beam emitting unit is configured to irradiate the laser beam such that an end portion of the electrode lead protruding forward and a side portion of the main bus bar in the left-and-right direction are combined to each other, or configured to irradiate the laser beam such that an end portion of the electrode lead protruding forward and side portions of the main bus bar and the pressurizing bus bar in the left-and-right direction are combined to each other.

7. The laser welding apparatus of claim 4, wherein the battery module further comprises a bus bar frame configured such that the main bus bar and the pressurizing bus bar are mounted on a front surface of the battery module, and
    wherein the bus bar frame comprises a guide protrusion provided at top and bottom of the pressurizing bus bar, protruding forward, and elongated in the left-and-right direction to guide movement of the pressurizing bus bar in the left-and-right direction.

8. The laser welding apparatus of claim 1, further comprising a jig transport unit connected to one side of the pressing bar and generating a moving force in a horizontal direction to move the pressing bar in the left-and-right direction.

9. The laser welding apparatus of claim 1, further comprising:
   a base plate on which the pressing jig and the blocking block are mounted; and
   a module mounting portion extending in an upward direction from the base plate and opened such that the electrode lead of the battery module and the main bus bar are externally exposed.

10. A battery module manufacturing system comprising the laser welding apparatus according to claim 1.

11. A laser welding apparatus configured to weld an electrode lead of at least one secondary battery of a battery module and a main bus bar configured to electrically connect a plurality of secondary batteries to each other, the laser welding apparatus comprising:
    a laser beam emitting unit comprising a laser emitting element to irradiate a laser beam to the electrode lead and the main bus bar;
    a pressing jig comprising a pressing bar configured to move in a left-and-right direction such that the electrode lead is adhered to the main bus bar; and
    a blocking block movable to block the laser beam generated in the laser beam emitting unit from reaching the at least one secondary battery or movable to allow the generated laser beam to pass therethrough, according to a position of the pressing bar moved in the left-and-right direction,
    wherein the blocking block comprises:
      a blocking plate configured to be movable in a horizontal direction and having a plate shape elongated in an up-and-down direction; and
      a hinge connection member configured to be connected to one side of the blocking plate and having a bar shape elongated in the horizontal direction.

12. A laser welding apparatus configured to weld an electrode lead of at least one secondary battery of a battery module and a main bus bar configured to electrically connect a plurality of secondary batteries to each other, the laser welding apparatus comprising:
    a laser beam emitting unit comprising a laser emitting element to irradiate a laser beam to the electrode lead and the main bus bar;
    a pressing jig comprising a pressing bar configured to move in a left-and-right direction such that the electrode lead is adhered to the main bus bar;
    a blocking block movable to block the laser beam generated in the laser beam emitting unit from reaching the at least one secondary battery or movable to allow the generated laser beam to pass therethrough, according to a position of the pressing bar moved in the left-and-right direction; and
    a jig transport unit connected to one side of the pressing bar and generating a moving force in a horizontal direction to move the pressing bar in the left-and-right direction.

* * * * *